United States Patent [19]

Böhner et al.

[11] Patent Number: 4,767,175
[45] Date of Patent: Aug. 30, 1988

[54] ROTARY DEVICE FOR TRANSMITTING LIGHT SIGNALS INCLUDING ANNULAR PHOTOELECTRIC TRANSDUCERS

[75] Inventors: Christian Böhner, Schlüsselfeld; Harold Gähr; Gerhard Wohlhaupter, both of Frickenhausen, all of Fed. Rep. of Germany

[73] Assignee: Emil Wohlhaupter & Co., Frickenhausen, Fed. Rep. of Germany

[21] Appl. No.: 886,026

[22] Filed: Jul. 15, 1986

[30] Foreign Application Priority Data

Jul. 26, 1985 [DE] Fed. Rep. of Germany ....... 3526713

[51] Int. Cl.⁴ .............................. G02B 6/36; H01J 5/16
[52] U.S. Cl. ............................ 350/96.20; 350/96.16; 350/96.15; 350/96.22; 250/227
[58] Field of Search ............... 350/96.10, 96.15, 96.24, 350/96.16, 96.22, 96.20, 96.29, 96.30; 250/227, 234, 236; 310/231, 232

[56] References Cited

U.S. PATENT DOCUMENTS

| | | | |
|---|---|---|---|
| 4,165,913 | 8/1979 | Fitch | 350/96.15 |
| 4,190,318 | 2/1980 | Upton, Jr. | 350/96.20 |
| 4,236,070 | 11/1980 | Lee | 250/227 X |
| 4,278,323 | 7/1981 | Waldman | 350/96.20 |
| 4,436,368 | 3/1984 | Keck | 350/96.33 |
| 4,460,242 | 7/1984 | Birch et al. | 350/96.20 |
| 4,466,695 | 8/1984 | Kruger | 350/96.20 |
| 4,641,915 | 2/1987 | Asakawa et al. | 350/96.20 X |
| 4,711,516 | 12/1987 | Graber | 350/96.15 |
| 4,725,116 | 2/1988 | Spencer et al. | 350/96.20 |

FOREIGN PATENT DOCUMENTS 3019132 11/1981 Fed. Rep. of Germany ... 350/96.20 X
2059621 4/1981 United Kingdom ......... 350/96.19 X Primary Examiner—William L. Sikes
Assistant Examiner—Brian M. Healy
Attorney, Agent, or Firm—Shenier & O'Connor

[57] ABSTRACT

A device for transmitting light signals between two structural members rotating relative to one another about an axis of rotation, one of these members bearing a light emitter, preferably a light conductor, and the other bearing a photoelectric transducer placed opposite the light emitter so as to leave a gap therebetween, the transducer converting the light signals received into electrical signals. The light emitter emits light through an emission opening provided at a predetermined distance from the axis of rotation. An annular photoelectric transducer which is centered relative to the axis of rotation is located opposite the emission opening and is irradiated by the light emerging therefrom.

11 Claims, 2 Drawing Sheets

ROTARY DEVICE FOR TRANSMITTING LIGHT SIGNALS INCLUDING ANNULAR PHOTOELECTRIC TRANSDUCERS

The invention relates to a device for transmitting light signals between two structural members rotating relative to one another about an axis of rotation, one of these members bearing a light emitter and the other bearing a photoelectric transducer placed opposite the light emitter so as to leave a gap therebetween, the transducer converting light signals received from the light emitter into electrical signals.

BACKGROUND OF THE INVENTION

In a known device of this type (DE-OS No. 30 19 132) the light emitter is provided as a light conductor designed as a circular ring loop and the light emerges from its entire circular circumference. The photoelectric transducer is provided as a more or less punctiform photoelectric cell which is guided along the light conductor curved to form a circle on a corresponding circular path. As only a small fraction of the total light energy conveyed by the light conductor can be absorbed at any time with this arrangement it is relatively insensitive and unsuitable for transmitting weaker signals. In addition, the light emerging at the circumference is, in practice, inhomogeneous and leads to interferences or signal distortions.

SUMMARY OF THE INVENTION

The object of the invention is to improve a device of the type in question such that the photoelectric transducer can constantly absorb substantially the entire signal energy conveyed from a light emitter, in particular a light conductor, and thereby supply practically interference-free signals.

This object is accomplished in accordance with the invention in that the light emitter emits light through an emission opening provided at a predetermined distance from the axis of rotation of the structural members and an annular photoelectric transducer centered relative to the axis of rotation faces the emission opening and is irradiated by the light emerging therefrom.

The basic concept of the invention is therefore to design the photoelectric transducer as an annular transducer which is closed to from a complete circle. The emission opening of a light emitter is then moved along the transducer on a corresponding circular path. When a light-wave conductor is used as light emitter, the emission opening is designed in accordance with the invention such that substantially the entire radiant energy conveyed by the light-wave conductor issues from this opening. The emission opening is preferably disposed transversely to the axial direction of the light conductor and not, as previously, on its circumference.

BRIEF DESCRIPTION OF THE DRAWINGS

The following description of preferred embodiments of the invention serves to explain the invention in greater detail in conjunction with the attached drawings, in which.

DETAILED DESCRIPTION OF THE INVENTION

Figure 1:
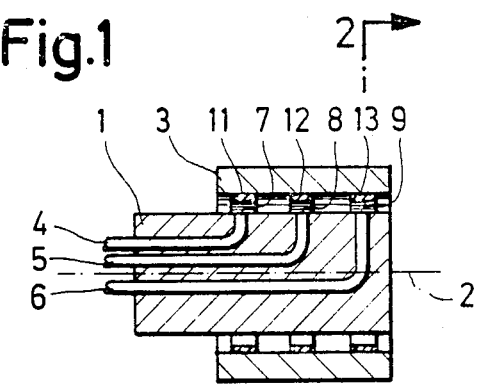
FIG. 1 is a schematic longitudinal section of two structural members rotating relative to one another, with light signals being transmitted to photoelectric transducers.

FIG. 1 is a schematic illustration of a first structural member 1 which rotates in the form of a shaft about an axis of rotation 2. The structural member 1 is enclosed by a sleeve-like structural member 3 such that a gap is left therebetween. This structural member 3 is stationarily held. Light conductors 4, 5, 6 are arranged in the interior of the member 1 parallel to the axis of rotation and are bent at their ends such that they open radially at the cover surface of the member 1 with their emission openings 7, 8, 9 and the light conveyed by the light conductors can exit at these openings in a radial direction. The emission openings 7, 8, 9 extend at right angles to the axes of the light conductors. The bend in the light conductors shortly before they exit from the member 1 need not necessarily be at right angles. In this case, the light would exit from an emission opening which is inclined in relation to the axis of the light conductor.

Photoelectric transducers 11, 12, 13, which are annular in shape and closed to form a complete circle, are disposed in the interior of the sleeve-like structural member 3 such that they face the emission openings 7, 8, 9 but leave a small gap therebetween. These transducers are irradiated by the light energy emerging from the respective emission openings. This light energy constitutes practically the entire light energy conveyed in each light conductor because the emission openings each extend substantially at right angles or transversely to the longitudinal axes of the light conductors. When the member 1 rotates relative to the member 3 (or, reversely, the member 3 rotates relative to the stationary member 1), the annular transducers are constantly irradiated by the light emerging from the light conductors so that light signals can be continuously converted into corresponding electrical signals.

Figure 2:
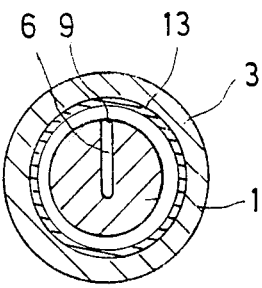
FIG. 2 is a cross-sectional view along line 2—2 in FIG. 1.
Figure 3:
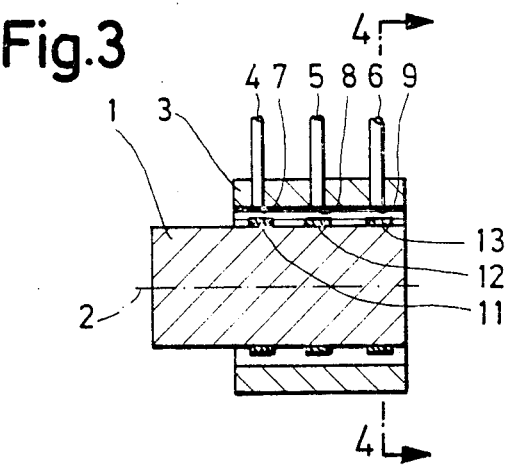
FIG. 3 is a modified view similar to FIG. 1 with a different arrangement of the light conductors and transducers.
Figure 4:
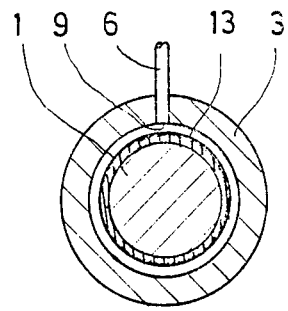
FIG. 4 is a cross-sectional view along line 4—4 in FIG. 3.

The arrangement of FIGS. 3 and 4 differs from the arrangement of FIGS. 1 and 2 merely in that the light conductors 4, 5, 6, with their emission openings 7, 8, 9, are arranged on the sleeve-like member 3 and the annular transducers 11, 12, 13 on the shaft-like member 1. One of the members 1 and 3 of the arrangement according to FIGS. 3 and 4 also rotates relative to the other, which is held stationary. It is also possible to have arrangements which are a mixture of those shown in FIGS. 1, 2 and 3, 4. In this respect, both light transmitters (light conductors 4, 5, 6) and light receivers (transducers 11, 12, 13) can be arranged simultaneously on either of the members 1, 3 rotating relative to one another.

Figure 5:
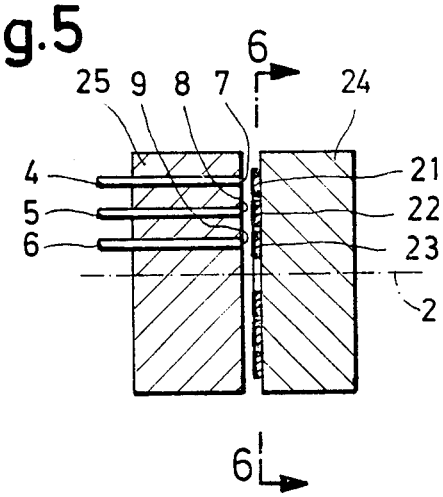
FIG. 5 is a further modified embodiment of a device for transmitting light signals.
Figure 6:
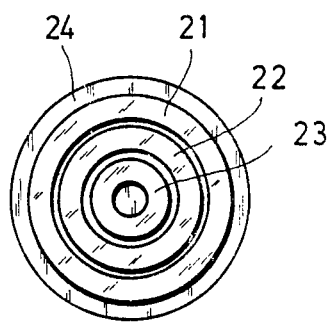
FIG. 6 is a view along line 6—6 in FIG. 5.

In contrast to the arrangements of FIGS. 1 to 4, in which the transducers are disposed so as to be axially adjacent one another on the first member 1, the arrangement of FIGS. 5 and 6 is provided with annular transducers 21, 22, 23 which are arranged concentrically to one another. The transducers 11, 12, 13 of FIGS. 1 to 4 have the shape of low cylindrical rings. The converters 21, 22, 23 of FIGS. 5 and 6 are designed as flat, annular bands or strips closed to form a circle.

The annular transducers 21, 22, 23 are arranged on an end face of a structural member 24. The emission openings 7, 8, 9 of the light conductors 4, 5, 6, which extend within a structural member 25, are located opposite these transducers. The members 24 and 25 are rotatable about the axis of rotation 2 relative to one another. Otherwise, the arrangement of FIGS. 5 and 6 functions in the same way as that of FIGS. 1 to 4.

In FIG. 1, the surface of the transducers 11, 12, 13 receiving the light is a cylindrical inner casing, in FIG. 2 a cylindrical outer casing and in FIGS. 5 and 6 an annular plane surface. In other embodiments of the structural members rotating relative to one another, the light-receiving surface may also be an optional conical surface.

The light conductors 4, 5, 6 may be provided in the customary manner as individual fibers or as a fiber bundle. Optical components and elements, for example in the form of lenses, prisms or the like, may be provided in a manner known per se at the emission openings. These components and elements determine the shape of the emerging beam of light and therefore the size and geometrical shape of the light spot generated on the transducer.

The light signals conveyed by the light conductors 4, 5 and 6 may result from corresponding electrical signals which are converted in a manner known per se, for example with the aid of incandescent lamps, light diodes, laser diodes and the like. In other embodiments of the invention, the light emitted from these light emitters may impinge directly on an annular transducer, i.e. without the intermediary of a light conductor. It is also possible to convey a plurality of light signals via one single light conductor in a manner known per se and to separate these signals accordingly before they exit from a rotating member, for example by dividing the signals between various light wavelengths or various time phases.

The annular transducers may be designed as photoelectric cells, photoconductive cells, phototransistors, photodiodes or the like. The annular transducer may be formed, for example, in one piece from correspondingly shaped semiconductor elements (FIGS. 1–6).

Figure 7:
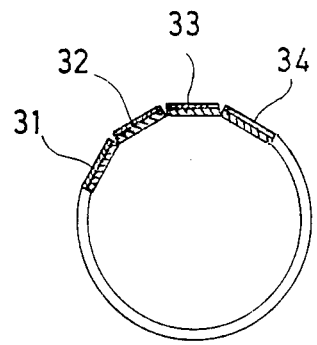
FIGS. 7 and 8 show an annular photoelectric transducer.
Figure 8:
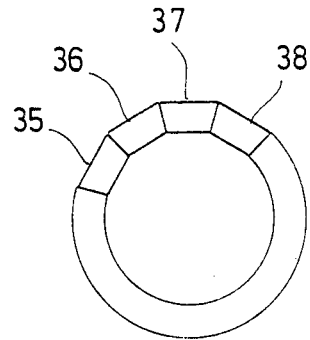
Figure 9:
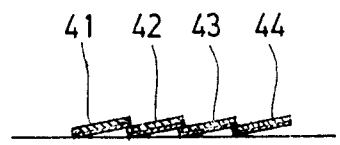
FIGS. 9 and 10 show an annular photoelectric transducer composed of individual elements.
Figure 10:
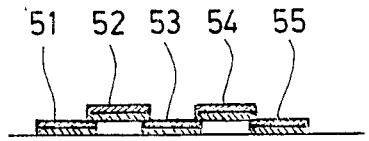

FIGS. 7 to 9 show the composition of the annular transducer consisting of individual photoelectric elements, for example photoelectric cells, which are electrically connected in parallel. FIG. 7 shows a cylindrical inner wall surface formed from the individual elements 31, 32, 33, 34, the embodiment in FIG. 8 has a plane surface forming a closed ring and consisting of the individual elements 35, 36, 37, 38. The individual elements may be placed next to one another with or without a small gap in between (FIGS. 7 and 8) or overlap one another, as illustrated in FIGS. 9 and 10. When a plurality of photoconductive cells are used, these are preferably series-connected.

Figure 11:
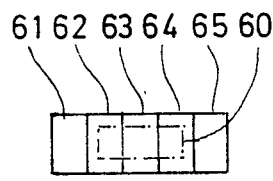
FIG. 11 shows the geometric shape of a spot of light on a plurality of transducer elements and FIG. 12 is a further modified embodiment of a device for transmitting light signals.

In the case of a photoelectric transducer consisting of individual elements, the light impinging thereon may be subject to partial dissipation due to deflection and refraction at gaps and edges and thus result in distorted signals. In order to keep such partial dissipation to a great extent constant and proportional to the signal strength, the geometric shape of the impinging light can, as already mentioned, be determined accordingly by use of optical elements. Particularly advantageous is a longitudinal elongation of the light spot travelling across the annular transducer in the direction of movement. The extent of longitudinal elongation is then such that a plurality of individual elements are always simultaneously impinged by the light spot. A light spot of this type is shown in FIG. 11 by reference numeral 60. It extends simultaneously across three of the illustrated individual elements 61, 62, 63, 64, 65 of the transducer. The light spot 60 could also be round or oval in shape. This may also be attained by using suitable optical elements such as diaphragms, mirrors, prisms, lenses and the like.

Figure 12:
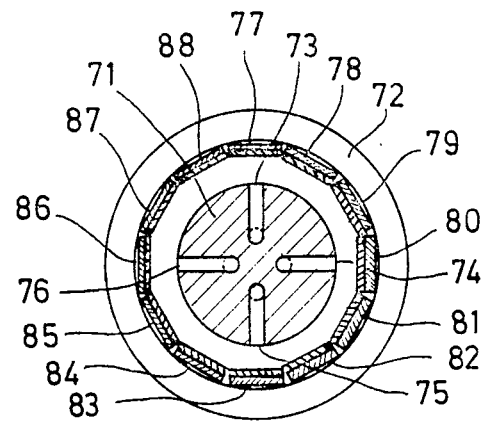

In the devices for transmitting and converting light described so far, each emission opening (e.g. the emission opening 7 in FIG. 1) moves past a transducer (transducer 11) along a designated path or track. When an annular transducer consists of individual elements, a plurality of light signals may be transmitted on a single path from a plurality of light conductors. This is illustrated in FIG. 12. A centrally disposed, rotating structural member 71 is enclosed by an annular, stationary structural member 72. The emission openings 73, 74, 75 and 76 of a total of four light conductors are located on the rotating structural member 71. The stationary structural member 72 bears a transducer ring formed by the individual elements 77 to 88. The emission openings 73 to 76 revolve along one path. The individual elements provided on the structural member 72, which face the respective emission openings and are irradiated by the light emerging therefrom, are in this case connected to different outputs in synchronism with rotation of the structural member 71 or rather the emission openings by electrical circuit means which are known per se. In this way, the signals exiting from the individual light conductors may be associated each time with corresponding, electrical measurement signals.

In the embodiments described in the above, use is substantially made of only light conductors and emission openings provided thereon as light emitters. Other light sources, in particular light diodes, laser diodes, incandescent lamps, fluorescent lamps or the like, are also suitable as light emitters if they are likewise associated with only one annular transducer and light emitter and transducer rotate relative to one another. The distance between the light emitter and the axis of rotation need not be equal to the radius of the transducer. It is also possible in this case for light to impinge on the transducer at an angle or via optical elements causing beam deflection or the like.

What is claimed is:

1. A device for transmitting light signals between two structural members rotating relative to one another about an axis of rotation, one of said members bearing a light emitter emitting light and the other bearing a photoelectric transducer placed opposite said light emitter so as to leave a gap therebetween, said transducer converting light signals received from said light emitter into electrical signals, characterized in that said light emitter (4,5,6) emits light through an emission opening (7,8,9) provided at a predetermined distance from said axis of rotation (2) of said structural members (1,3) and an annular photoelectric transducer (11,12,13) centered relative to said axis of rotation faces said emission opening and is irradiated by the light emerging from said emission opening, that a plurality of annular transducers (11, 12, 13; 21, 22, 23) arranged concentrically or axially adjacent one another in relation to said axis of rotation (2) are simultaneously irradiated by a plurality of light emitters (4,5,6) and that each of said annular transducers consists of a plurality of individual photoelectric cells (31,32,33,34) placed next to one another without a gap in between and electrically connected in parallel.

2. Device as defined in claim 1, characterized in that said light emitter or emitters (4, 5, 6) are arranged on a rotating structural member (1 or 3) and said transducer or transducers (11, 12, 13) on a stationary structural member (3 or 1).

3. Device as defined in claim 1, characterized in that the individual elements (41, 42, 43, 44) overlap one another.

4. Device as defined in claim 1, characterized in that the light emerging from said emission opening (7) simultaneously irradiates a plurality of individual elements (62, 63, 64).

5. Device as defined in claim 1, characterized in that an annular transducer consisting of a plurality of individual elements (77 to 88) is irradiated simultaneously from a plurality of emission openings (73, 74, 75, 76) and said individual elements are connected by circuit elements to different electrical outputs in synchronism with rotation of the structural members (71, 72).

6. Device as defined in claim 1, characterized in that the light signals transmitted from said light emitter (4, 5, 6) to said annular transducer (11, 12, 13) are formed from signals of a different type, in particular electrical signals, by corresponding conversion.

7. Device as defined in claim 1, characterized in that said light emitter is a light conductor (4, 5, 6).

8. Device as defined in claim 9, characterized in that said light conductor (4, 5, 6) is designed as a single fiber or as a fiber bundle.

9. Device as defined in claim 7, characterized in that the geometric shape of the beam of light (60) impinging on said transducer is determined by the distribution of the fibers in a light conductor fiber bundle at said emission opening (7).

10. Device as defined in claim 1, characterized in that the geometric shape of the beam of light (60) impinging on said transducer (11) is determined by optical elements, such as diaphragms, lenses, prisms, mirrors or the like, arranged at or behind said emission opening (7).

11. Device as defined in claim 7, characterized in that said emission opening (7, 8, 9) of said light conductor (4, 5, 6) extends substantially transversely to the longitudinal axis thereof.

* * * * *

UNITED STATES PATENT AND TRADEMARK OFFICE
CERTIFICATE OF CORRECTION

PATENT NO. : 4,767,175

DATED : August 30, 1988

INVENTOR(S) : CHRISTIAN BOHNER, HAROLD GAHR, GERHARD WOHLHAUPTER

It is certified that error appears in the above-identified patent and that said Letters Patent is hereby corrected as shown below:

Column 6, line 10, " 9" should read

-- 7 --.

Signed and Sealed this

Eleventh Day of July, 1989

Attest:

DONALD J. QUIGG

Attesting Officer

Commissioner of Patents and Trademarks